May 28, 1968     C. J. BREUKINK ET AL     3,385,917

METHOD AND APPARATUS FOR EXTRUDING PLASTICS

Filed May 12, 1965

INVENTORS:
CAREL J. BREUKINK
JACOB VERMEULEN
BY: *Kenneth H. Cocks*
THEIR AGENT

United States Patent Office 3,385,917
Patented May 28, 1968

3,385,917
METHOD AND APPARATUS FOR
EXTRUDING PLASTICS
Carel J. Breukink, Rijswijk, and Jacob Vermeulen, Zoetermeer, Netherlands, assignors to Shell Oil Company, New York, N.Y., a corporation of Delaware
Filed May 12, 1965, Ser. No. 455,248
Claims priority, application Netherlands, May 12, 1964, 64—5,249
8 Claims. (Cl. 264—51)

ABSTRACT OF THE DISCLOSURE

Apparatus and method for extruding plastic materials. A hollow barrel member is provided having rotatable screw means operatively positioned within the barrel member near one end thereof. An extrusion orifice is formed in the opposite end of the barrel member and a reduced-diameter mandrel member is positioned within the barrel intermediate the screw means and extrusion orifice. Heat exchange channels are formed in both the barrel and the mandrel for circulating a heat exchange liquid thereto. A plurality of heat exchange fins are mounted on at least a portion of the outer surface of the mandrel and arranged circumferentially in axial rows with the main surface of each fin being substantially parallel to the longitudinal axis of the mandrel, the fins in each row being staggered relative to the fins of an adjacent row.

---

This invention relates to a method and apparatus for extruding plastic materials. More particularly, the invention is directed to an improved extruder and process having an efficient and accurately controllable heat exchange system whereby an effective heat exchange with the material to be extruded can be obtained in the extruder.

Typical thermoplastic or thermosetting extruders comprise, inter alia, a feed inlet at one end of a barrel, which barrel houses a feed screw, and an extrusion head having an extrusion orifice or annulus at the other end of the barrel.

According to the present invention the extrusion head and/or the barrel of the extruder proper are provided with means for controlling in situ the temperature of the material to be extruded. Another related aspect of the invention involves the provision of a heat exchange means within the barrel and/or the extrusion head, said heat exchange means being adapted to continuously split up and recombine the material flowing through the apparatus.

The advantage of repeatedly splitting up and recombining the material to be extruded is that a homogeneous temperature of the material is obtained so that after leaving the extruder, the material can be excellently worked up, for example, into films of straight or foamed plastic.

The discharge temperature of the extruded material is often of great importance for obtaining a product of good quality. The discharge temperature is also directly related to the production rate of finished product through the extruder. Thus, in some situations it is necessary to first heat the material in the extruder (e.g., to melt a thermoplastic or initiate the reaction of a thermosetting plastic material) and then cool the material prior to discharge from the extruder head in order to insure a product of good quality. In addition, it is very important that the temperature be substantially uniform throughout the cross section of the material.

The aforementioned requirements are especially important in the manufacture of a film of thermoplastic foam, such as polystyrene foam, where an incorrect temperature results in a product having an undesirable cell size, burst cells or an uneven and consequently less acceptable surface.

Further, in film-blowing processes there are special problems created by the high temperatures at which the extrudate exits through the extrusion head. At such temperatures the viscosity of the extrudate is very low and the freshly extruded portion of the balloon obtained by blowing the extruded tubular film is very soft and especially sensitive to slight fluctuations in the ambient pressure and/or temperature. Air cooling of the balloon, which is the method often used, cannot remove this drawback but instead increases the instability of the ballon by creating whirls.

In order to obviate the many and varied difficulties leading to defective extruded plastic products, prior art methods and apparatus have been forced to maintain a low extrusion or production rate.

The primary object of this invention is, therefore, to provide an extruder having a more efficient and more readily controllable heat exchange or cooling system, so that a better product can be produced at a faster rate. To this end the extruder according to the invention is characterized in that heat exchange bores and/or channels are provided both in the barrel and the extrusion head, through which channels a cooling and/or heating liquid may be passed for cooling or heating the material to be extruded as the latter flows through the apparatus.

A further object of the invention is the provision of fin-like heat exchange members which come into contact with the material to be extruded. In a preferred embodiment the fins are arranged radially on the external surface of a reduced diameter mandrel positioned within the extruder barrel, at a location between the feed screw and the extrusion opening, in a plurality of rings, the fins of successive rings being staggered relative to each other so that the material flowing through the apparatus is continually split up and recombined whereby the fins effectively carry heat to all portions of the material.

Other objects and advantages of the invention will be better understood from the following description taken with reference to the accompanying drawings wherein.

Figure 1:
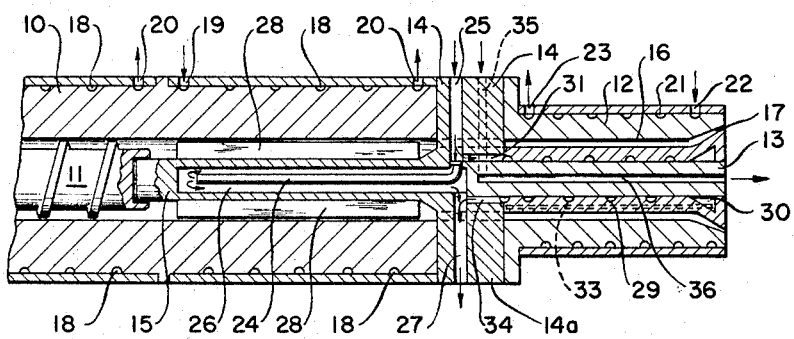
FIGURE 1 is a longitudinal section of the front or discharge end of an extruder in accordance with the invention.

Referring to FIGURE 1 of the drawings, there is shown a worm screw 11 rotatably mounted in a barrel 10. At the front of the barrel 10 there is an extrusion head consisting of a shell 12 and a mandrel 13, leaving an annular passage 16. The mandrel 13 is fixedly arranged relative to the shell 12 by means of one or more radially-directed spokes 14, 14a. A hollow cooling mandrel 15, fixedly connected at one end to the spokes 14, is situated in the extruder between the worm screw 11 and the spokes 14, 14a. At its other end the cooling mandrel 15 is rotatably journalled in the worm screw 11, so that the worm screw 11 can rotate around the stationary cooling mandrel 15. The material to be extruded is moved forward by the rotating worm screw 11, this material first flowing through the space between the cooling mandrel 15 and the barrel 10, then along the spokes 14, 14a to and through the passage 16 between the extrusion head 12 and the mandrel 13, and subsequently being extruded from the funnel-shaped, forwardly narrowing orifice 17 between the extrusion mandrel 13 and shell 12.

The barrel 10 of the extruder contains a number of helical cooling channels 18 having inlets 19 and outlets 20 for pumping cooling water or other fluid through the channels 18.

The shell 12 of the extrusion head is likewise provided with helical channels 21 having an inlet 22 and an outlet 23.

The cooling mandrel 15 contains an inner pipe 24 which may be connected to a cooling-water line through a channel or bore 25 provided in the spoke 14 and communicating with the pipe 24 as shown. Upon leaving the inner pipe 24 the cooling water in the cooling mandrel 15 flows into and through the annular channel 26 between the inner wall of the hollow cooling mandrel 15 and the outer wall of the inner pipe 24 and subsequently leaves the extruder through a discharge channel or bore 27 communicating with the annular channel 26 and situated in the spoke 14a. The outer wall of the cooling mandrel 15 is provided with a number of radially-directed heat exchange fins 28 to promote the heat exchange between the material flowing between the cooling mandrel 15 and the barrel 10 and the cooling water flowing through the cooling mandrel 15. These heat exchange fins will be described in greater detail, infra.

The extrusion mandrel 13 is provided with a helical cooling channel 29 which leads to a conical space 30 adjacent the funnel shaped, forwardly narrowing orifice at 17. Cooling water may be supplied to the channel 29 through the channel 25 and a channel or bore 31 in the spoke 14. The cooling water flows from the conical space 30 through a return channel or bore 33 situated in the mandrel 13 and subsequently leaves the extruder through a channel 34 and the channel 27 provided in the spoke 14a.

The spoke 14 is also provided with an air supply bore 35 communicating with an axial bore 36 in the mandrel 13. The axial bore 36 issues at the front of the mandrel 13 to supply air into the tube or balloon being extruded from the orifice 17, for example, to blow up this tube in order to obtain a larger diameter as is common in the blow extruding art.

In the described extruder the material to be extruded is cooled both internally and externally from the worm screw 11 down to the front of the extrusion head, whereby a strong and uniform cooling is obtained which effect cannot be achieved by providing cooling members only in the barrel 10 and/or shell 12. In this connection it should be noted that, when extruding polymers, the possibilities for improving the cooling by using a lower cooling water temperature or by increasing the flow rate of the cooling water are limited. This is due to the poor heat conductivity of the said material, as a result of which, in the case of very strong local cooling, the portion of the material in contact with the cooled wall is excessively cooled, so that the flow decreases there and the rest of the material remains too hot.

The described extruder with improved cooling has prooved to be of particular advantage in the manufacture of polystyrene foam. As is known, this material may be produced by feeding polystyrene and a foaming agent, for example, liquid isopentane, to an extruder in a certain ratio. The polystyrene and the pentane are mixed in the extruder and extruded from the extrusion head in the form of a tubular foamed extrudate as a result of the expansion of the isopentane. By means of air supplied through the extrusion mandrel, the extrudate may be blown up between the end of the mandrel and a set of nipper rolls located downstream to form a large-diameter balloon and, after passing the nipper rolls, the balloon may then be cut in a longitudinal direction to form long webs.

It has been found that the temperature of the material when it leaves the extrusion head has a great influence on the quality of the polystyrene foam, in particular on the evenness and the outward appearance of the surface and also on the form and size of the cells formed. The discharge temperature, for instance, must not be higher than 145° C.–150° C. With the known extruders this requirement can only be met by maintaining long cooling times, i.e., by causing the material to proceed slowly through the extruder, for example, by causing the worm screw to rotate at a low speed, so that less heat is generated. This renders the process time-consuming and costly, while the capacity of the apparatus is not fully utilized.

Figure 2:
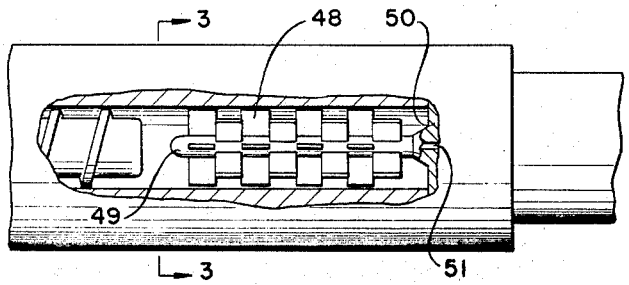
FIGURE 2 is a side elevation, partially in longitudinal section, of a modified embodiment of apparatus in accordance with the invention.
Figure 3:
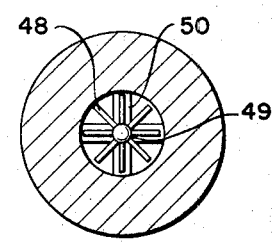
FIGURE 3 is a cross-sectional view taken on the line 3—3 of FIGURE 2.

Referring now to the modified embodiment of FIGURES 2 and 3, the heat exchange fins 48 are arranged on the outer surface of hollow cylindrical body 49 supported by radial spokes 50. The body 49 is provided with a bore 51 through which a medium, for example, oil or water, may be supplied to and/or withdrawn from the interior thereof.

Figure 6:
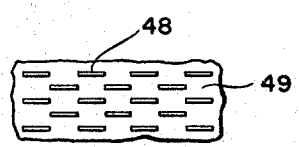
FIGURE 6 is a schematic plan view of a cylinder to which heat exchange fins have been applied circumferentially in staggered relation in accordance with the invention.

The outer surface of the cylindrical body 49 is schematically illustrated in FIGURE 6. As shown in FIGURE 6, the fins 48 are arranged in a plurality of axial rows, the fins of one row being staggered relative to the fins of an adjacent row.

Figure 7:
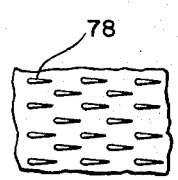
FIGURE 7 is a schematic plan view, similar to that shown in FIGURE 6, but illustrating a modified fin configuration in accordance with the invention.

The fins 78 of FIGURE 7 differ only in shape from the fins according to FIGURES 2, 3 and 6, the arrangement being the same. Thus, the fins 78 differ from the fins 48 in that the former are not rectangular in cross section but have a streamlined profile. In both configurations the plastic material passing through the apparatus is continually split up and recombined due to the staggered relation of the fins.

Figure 4:
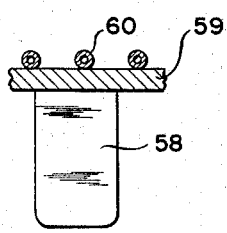
FIGURE 4 is a schematic elevation, partially in section, of a heat exchange fin according to the invention.

FIGURE 4 shows in detail a possible system for supplying heat to or withdrawing it from a fin 58. The fin 58 is secured to or forms an integral part of a metal plate or cylinder 59, which may, for example, be the shell of an extruder. Against the plate or cylinder 59 is arranged a coil 60, through which a medium such as water or oil may be passed. As a result, the heat absorbed by the fin 58 may be readily withdrawn or heat may, via the fin 58, be supplied to the material to be extruded.

Figure 5:
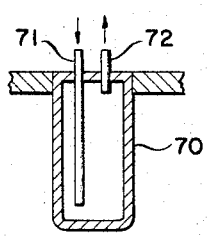
FIGURE 5 is a schematic elevation, partially in section, of a modified embodiment of a heat exchange fin according to the invention.

FIGURE 5 shows a hollow fin 70. By means of tubes 71 and 72 a medium may be respectively supplied and withdrawn from the interior of the fin 70, so that the heat absorbed by the fin 70 may be withdrawn, or heat may, via the fin 70, be supplied to the material to be extruded.

During normal operation, particles of plastic material, for example, of a thermoplastic material are supplied to the extruder via the feed inlet. Owing to the rotation of the screw this material is compressed and moved to the extrusion orifice in the extrusion die head. In this case the material to be extruded flows along the said fins of the heat exchanger. Consequently, the material to be extruded is split up into streams, which are repeatedly divided and recombined by the fins. By cooling the fins with a suitable cooling liquid, heat will be withdrawn via the fins from the material to be extruded. Conversely, it is also possible to heat the film by means of a hot liquid, as a result of which heat will be supplied via the fins to the material to be extruded.

Plastic materials which may be processed by using the process and extruder described are, for example, polyolefins, vinyl polymers, isoprene rubber, polyurethanes, etc.

In order to illustrate the improvement that can be achieved with the novel extruder, the table below shows the results of tests carried out with an extruder which was only provided with externally cooled shells (tests A) and with an extruder having both internal and external cooling according to the invention (tests B). Starting materials were polystyrene with isopentane as foaming agent and with the addition of small amounts of sodium bicarbonate and citric acid. The polystyrene foam produced had a final density, after blowing, of 70 g./l. and a cell size of 0.15–0.20 mm. The extruder was provided with a 60 mm. 27 L/D worm screw. The maximum permissible discharge temperature of the polystyrene foam was 150° C.

| Speed, worm screw, r.p.m. | Discharge temperature extrudate, ° C. | |
| --- | --- | --- |
|  | Tests A | Tests B |
| 50 | 155 | 142 |
| 65 | 175 | 145 |
| 75 | 185 | 150 |

The above table shows that with the conventional extruder (tests A) the temperature rises far above the permissible value, at a worm screw speed even as low as 50 revolutions per minute. With the improved extruder (tests B) it was possible to reach a speed of 75 revolutions per minute before the temperature and hence the quality of the polystyrene foam became unacceptable. With the improved extruder it is, therefore, possible to speed up the production of polystyrene foam considerably, as a result of which a 50% higher yield can be obtained.

It will be clear that the improved extruder can lead to higher production speeds and/or a better quality of the extruded product in other applications as well. If the extrusion mandrel 13 as such is already fairly long it is sometimes possible to omit the cooling mandrel 15. However, it is generally desirable for the length of the internal cooling member, whether it is formed by the mandrel 13 alone or by the two mandrels 13 and 15 together to be at least three times the smallest outside diameter of the extrusion mandrel 13.

Comparative tests with a conventional extruder and the one according to the invention have also been carried out with polyethylene having a density of 918 g. 1 and a melting index of 0.3. In this case the extruder had an inside diameter of 60 mm., a length/diameter ratio of 20 and a compresion ratio of 4. The maximum speed (90 revolutions per minute) of the screw was used. With the conventional extruder in which only the cylinder shell can be cooled, it was not possible to attain a discharge temperature of the extrudate below 170° C. Further, it was found that this discharge temperature was only slightly dependent on the cooling temperature of the cylinder shell. Upon leaving the extrusion head the polyethylene tube was blown up with air via the blowing mandrel; the so-called "freezing line" of the balloon (the zone in which the initially clear balloon becomes turbid by crystallization occurring in the balloon) was at some decimeters from the extrusion head. After cooling in the mandrel had been initiated, using an extruder according to the invention, the freezing line was only a few centimeters from the extrusion head, resulting in a considerable improvement of the stability of the balloon. The yield could be increased by 50% from 20 to 30% kg./hr. The sensitivity to fluctuations in the feed was also found to have decreased considerably.

The extruder according to the invention and provided with a blowing mandrel also has great advantages in the manufacture of hollow articles formed by extruding the tube into a mole, air from the blowing mandrel pressing the tube placed in the mold against the walls of the mold, in the manner generally known, for example, in making bottles. As a result of the lower temperature of the extruded tube the cooling time of the shaped blow-molded bottle in the mold can be reduced considerably.

We claim as our invention:
1. A method of extruding plastic material comprising:
    (a) supplying said material to one end of an extruder;
    (b) heating said plastic material to a pre-selected temperature;
    (c) forcing said material while cooling said material to flow toward and out of an extrusion orifice located in the other end of said extruder; and
    (d) simultaneously maintaining said pre-selected temperature throughout the entire mass of said material by positioning a plurality of axial rows of heat exchange fins in the flow path of said material in such a manner that said material is flowed from a first fin to a second fin axially staggered relative to said first fin thereby continually splitting up and recombining said material.
2. A method as set forth in claim 1 wherein said extrusion orifice is a ring-shaped annulus and said material is extruded in tubular form, said method further comprising the step of supplying air through an opening in the center of said annulus to expand said tube of material.
3. A method as set forth in claim 2 wherein said extruded material comprises polystyrene foam and the exit temperature of said plastic tube from said annulus is maintained at a temperature not exceeding 150° C.
4. Apparatus for extruding plastic materials comprising:
    (a) a hollow barrel member;
    (b) rotatable screw means operatively positioned within said barrel member near one end thereof;
    (c) an extrusion orifice formed in the opposite end of said barrel member;
    (d) a reduced-diameter mandrel member positioned within said barrel intermediate said screw means and said extrusion orifice;
    (e) heat exchange channels formed in both said barrel and said mandrel for circulating a heat exchange liquid thereto;
    (f) a plurality of heat exchange fins mounted on at least a portion of the outer surface of said mandrel; and
    (g) said heat exchange fins being arranged circumferentially in axial rows with the main surface of each fin substantially parallel to the longitudinal axis of said mandrel, the fins in each row being staggered relative to the fins of an adjacent row.
5. Apparatus as in claim 4 wherein the length of the heat exchange channel in said mandrel is at least three times the smallest outside diameter of said mandrel.
6. Apparatus as in claim 4 wherein said heat exchange fins are hollow and in communication with the heat exchange channel formed in said mandrel.
7. Apparatus as in claim 4 wherein said mandrel member extends to and coperates with said extrusion orifice to give said orifice an annular shape, whereby a plastic tube may be extruded therethrough, and bore means formed within said mandrel to supply gas to the interior of a plastic tube being extruded through said annular orifice.
8. Apparatus for extruding plastic materials comprising:
    (a) an elongated barrel member;
    (b) rotatable screw means operatively positioned within said barrel member near one end thereof;
    (c) the other end of said barrel comprising an open-ended, hollow extrusion head;
    (d) spoke means extending radially inwardly toward the center of said barrel at a location between said screw means and said extrusion head;
    (e) a reduced diameter mandrel member integrally connected to said spoke means and extending longitudinally from a location near said screw means to said open-end of said extrusion head;
    (f) said mandrel member cooperating with the open-end of said extrusion head to form an annulus throu which a plastic material may be extruded in tubular form;
    (g) heat exchange channel means formed in said barrel and said mandrel;
    (h) channel means formed in said spoke means and communicating with the channel means formed in said mandrel for supplying heat exchange fluid thereto; and, (i) bore means formed in said spoke means and communicating with a second bore in said mandrel which second bore communicates with the open-end of said extrusion head for supplying a gas media thereto.

References Cited

UNITED STATES PATENTS

| | | | |
|---|---|---|---|
| 2,057,467 | 10/1936 | Williams | 18—14 |
| 2,633,602 | 4/1953 | Sverdrup | 18—14 |
| 2,766,480 | 10/1956 | Henning | 264—47 |
| 3,024,494 | 3/1962 | Szpila | 18—14 XR |
| 3,060,505 | 10/1962 | Brasie | 18—14 XR |
| 3,299,192 | 1/1967 | Lux | 264—48 |
| 3,304,580 | 2/1967 | Fochler | 18—14 |
| 3,310,617 | 3/1967 | Dygert et al. | 264—53 |

FOREIGN PATENTS 143,376  9/1951  Australia.

JAMES A. SEIDLECK, *Primary Examiner.*

P. E. ANDERSON, *Assistant Examiner.*